Feb. 6, 1951 P. B. WICKHAM 2,540,922
FACSIMILE PHASING SYSTEM
Filed Sept. 13, 1946
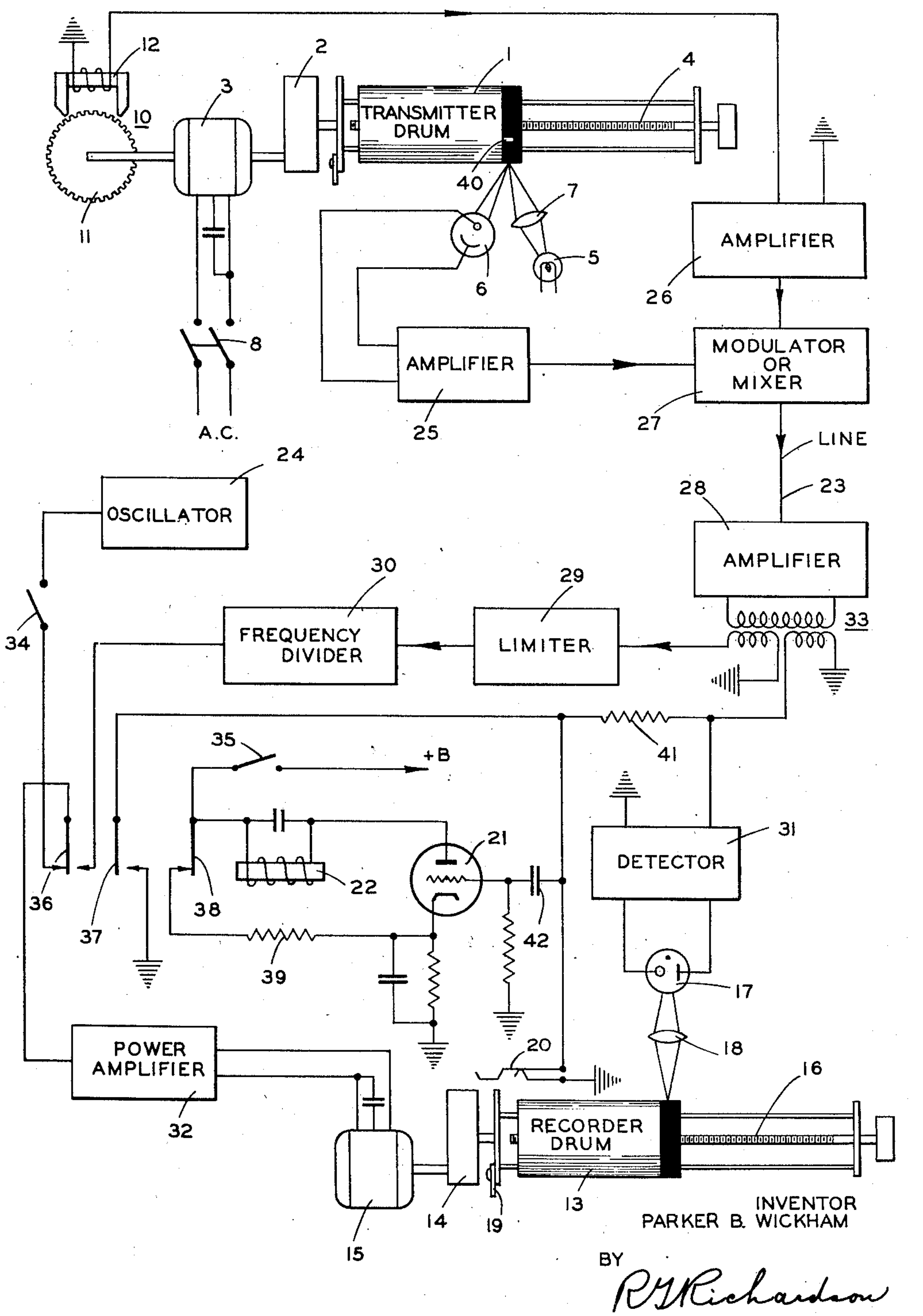
INVENTOR
PARKER B. WICKHAM
BY R. G. Richardson
ATTY.

Patented Feb. 6, 1951 2,540,922

UNITED STATES PATENT OFFICE 2,540,922

FACSIMILE PHASING SYSTEM

Parker B. Wickham, Delavan, Wis., assignor to The George W. Borg Corporation, Chicago, Ill., a corporation of Delaware Application September 13, 1946, Serial No. 696,795

4 Claims. (Cl. 178—69.5)

The present invention relates in general to facsimile systems, and the object of the invention is a new and improved method and circuit arrangement for synchronizing the apparatus at the receiving station with the apparatus at the transmitting station.

Describing the invention briefly, the carrier current used for transmission has a frequency which bears a fixed relation to the speed of the transmitter drum, and is preferably supplied by a generator coupled to the motor which drives the drum. After being modulated in accordance with the picture signals, the carrier current is transmitted to the receiving station, where it is divided between two channels. One channel includes the usual detector for rectifying the picture signals. In the other channel the carrier current is passed through a limiter to eliminate the picture signals, and a frequency divider to reduce the frequency to a desired sub-multiple frequency, and after the necessary amplification is used to operate the motor which drives the recorder drum.

The invention will be described more in detail in the specification which follows, reference being had to the accompanying drawing which shows diagrammatically the apparatus and circuits involved.

Referring to the drawing, the apparatus at the transmitting station includes the transmitter drum 1, for supporting the picture or other material to be transmitted. The drum is adapted to be rotated at the desired speed, 90 R. P. M., for example, by the synchronous motor 3 and suitable gears enclosed in the gear box 2. As the drum is rotated, it is moved from left to right past a scanning device by means of the lead screw 4. The scanning device comprises the source of light 5, a suitable lens system 7 for forming a spot of light on the drum, or picture supported thereon, and a photo cell 6. This apparatus is all well known and will need no further description.

The reference character 10 indicates a carrier current generator comprising a toothed disc 11 mounted on the shaft of the motor 3 and a permanent magnet 12 having pole pieces associated with the disc 11. The magnet 12 has a winding in which alternating current is generated responsive to the rotation of the disc. The carrier frequency may be 1800 cycles per second, for example.

At the receiving station the recorder drum is indicated at 13 and is driven by motor 15 through the medium of gears in the gear box 14. A lead screw 16 causes the drum to advance from left to right responsive to rotation. These parts are similar to the corresponding parts at the transmitting station. Recording is effected by means of a gas filled glow tube 17 and a lens system 18 which projects light from tube 17 on to a sensitized film which is carried by the drum 13.

The carriage which rotates the drum 13 is provided with a cam 19 which opens the contacts 20 momentarily at each rotation of the drum. These parts, as well as the tube 21 and relay 22, are used for bringing the rotation of drum 13 into phase with the rotation of drum 1.

A number of electronic equipment items of known construction are represented in the drawing by rectangles, and are sufficiently described by the accompanying labels. These items comprise the amplifiers 25 and 26 and the modulator or mixer 27 at the transmitting station, and the amplifier 28, limiter 29, frequency divider 30, oscillator 24, detector 31, and power amplifier 32 at the receiving station. The two stations may be connected over any suitable communication channel, represented in the drawing by the line 23.

It will be understood that the drawing does not purport to show all the details of the system, but only the equipment and circuits which are necessary to an understanding of the invention.

The operation of the system will now be explained, it being assumed for this purpose that a picture mounted on drum 1 at the transmitting station is to be transmitted over the line 23 and recorded on a sensitized film supported on the drum 13 at the receiving station. It will be understood that the operators at the two stations may be in communication with each other by telephone to effect the necessary coordination at the beginning and end of the transmission.

Everything being ready, the operator at the transmitting station will close the switch 8 to start the motor 3. The motor 3 is a synchronous motor and drives the drum 1 at a substantially constant speed, which may be 90 R. P. M., as previously mentioned. The speed of motor 3 may be 1800 R. P. M., for example, requiring a gear ratio in gear box 2 of 20 to 1.

The operator at the receiving station closes the switch 34, which connects the oscillator 24 to the power amplifier 32 by way of contacts of relay 22. The oscillator 24 has a frequency which differs substantially from the standard 60 cycle frequency of the commercial alternating current which drives the motor 3. The oscillator frequency may be, for example, 65 cycles per second. The power amplifier 32 accordingly delivers 65 cycle current to the motor 15 which drives the drum 13 and since other factors are the same the drum 13 rotates at a higher speed than the drum 1.

After the motor 15 has been started, the operator at the receiving station will close the switch 35, thereby connecting the positive pole of a suitable direct current source, labeled +B in the drawing, to the plate circuit of the tube 21. This circuit includes the relay 22, which is prevented from energizing at this time by a branch circuit extending through contacts 38 of relay 22 and resistor 39 to the cathode of tube 21. By means of this circuit a positive potential is placed on the cathode of the tube and since the grid of the tube is at ground potential the tube is baised nearly to cut-off and relay 22 cannot energize.

Returning now to the transmitting station, where motor 3 is driving the drum 1, the motor also drives the generator 10, which generates the carrier current. The frequency may be, for example, 1800 cycles per second, as previously mentioned. This carrier current is amplified by the amplifier 26 and is transmitted through the modulator 27 and over the line 23 to the receiving station.

There is a white spot 40 on the drum, with which the top margin of the picture is aligned, and as this spot is scanned during rotation of the drum phasing signals are generated by the photo cell 6. These signals are amplified by the amplifier 25 and are impressed on the carrier current at the modulator 27. The modulation of the carrier current should not exceed about 70%.

At the receiving station the modulated carrier current received over line 23 is amplified by the amplifier 28 and is then divided between two channels by means of the transformer 33. One of these channels is the picture signal channel which includes the detector 31. A branch of this channel extends by way of the resistor 41, which may have a value of one half megohm, and the condenser 42 to the grid of tube 21. The phasing signals being generated at the transmitting station appear in the picture signal channel and in the above described branch extending to the grid of tube 21 but they have no effect on the tube because of the shunt to ground through contacts 20 associated with recorder drum 13.

The foregoing is based on the assumption that the drum 13 is out of phase with drum 1, which will usually be the case. The film supported on drum 13 is so oriented with respect to the cam 19 that the top margin of the film passes through the axis of the lens 18 at the time the cam 19 opens the contacts 20. If the drums are out of phase, therefore, contacts 20 will be closed at the times when phasing signals are received and such signals will be ineffective, as above stated.

In the other channel, which may be referred to as the carrier channel, the modulated carrier current is passed through the limiter 29, where the phasing signals are eliminated. The output of the limiter, having a flat topped wave, is transmitted to the frequency divider 30. The frequency divider may comprise two oscillator stages dividing by 6 and 5, respectively, so that the output frequency is 60 cycles per second. More accurately, the output frequency of the frequency divider is the same as the frequency of the commercial alternating current, which drives the motor 3, as any variation in the latter frequency will cause a corresponding variation in the output frequency.

The recorder drum 13 is rotating at a higher speed than the transmitting drum 1 and eventually the two drums will come in phase with each other. When this occurs, the cam 19 will open the contacts 20 at a time when a phasing signal is received and the signal will be effective at tube 21 to cause the tube to pass current and energize relay 22. Upon energizing, relay 22 opens contacts 38, thus removing the bias from tube 21, so that the relay remains energized independent of the phasing signal. At contacts 37 relay 22 places a shunt around the contacts 20, and at contacts 36 the relay disconnects the power amplifier 32 from the oscillator 24 and connects it instead to the frequency divider 30. The power amplifier now changes its output frequency to 60 cycles per second, whereupon the motor 15, which drives the recorder drum, immediately slows down and runs at the same speed as motor 3 which drives the transmitter drum. The two drums now rotate at the same speed and in phase with each other.

Picture signals are transmitted by modulation of the carrier current and are detected and recorded in known manner. During the transmission of the picture a part of the modulated carrier current continues to be diverted into the carrier channel at the receiving station, where it is cleared of any picture signals, reduced in frequency, amplified and used to drive the motor 15 in the manner explained. The carrier current, therefore, serves a dual purpose, functioning not only as a medium for transmitting the picture signals but also as a means for rotating the recorder drum 13 at the same speed as the speed of the transmitter drum 1.

When the transmission of the picture is finished the operator at the transmitting station will open the switch 8 and the operator at the receiving station will open the switches 34 and 35, thereby shutting down the apparatus.

It will be understood that the oscillator 24 may have a frequency which is higher or lower than the output frequency of the frequency divider 30. It may be pointed out also that the carrier current frequency does not necessarily have to be 1800 cycles per second, although the output frequency of the frequency divider should be 60 cycles per second if the mechanical apparatus is to be the same as that at the transmitting station, since the motor 3 runs on 60 cycle alternating current. The carrier current frequency may be, for example, 2400 cycles per second, in which case the frequency divider may have two stages dividing by 8 and 5, respectively, or three stages dividing by 2, 4, and 5, respectively.

According to another modification, the output frequency of the frequency divider may be higher or lower than 60 cycles per second, and 60 cycle commercial alternating current can be used in place of the oscillator 24. With this arrangement, however, the gear ratio of the gearing in gear box 14 has to be different from that in gear box 2 so as to drive the drum 13 at the same speed as drum 1 notwithstanding the difference in the frequency of the alternating currents supplied to the motors 3 and 15. This modification is not adapted, therefore, to those situations where it is desired to use the same mechanical apparatus both for transmitting and receiving.

The invention having been described that which is believed to be new and for which the protection of Letters Patent is desired will be pointed out in the appended claims.

I claim:

1. In a facsimile system, a transmitter drum at a transmitting station, a carrier current generator, means for driving said drum and generator in synchronism, a channel over which the carrier current is transmitted to a receiving station, a recorder drum at said receiving station, a motor for driving said recorder drum, apparatus responsive to carrier current received over said channel for generating alternating current to drive said motor, said alternating current having the proper frequency to cause the motor to drive said recorder drum at the same speed as said transmitter drum, apparatus for generating alternating current having a different frequency, means whereby said motor is initially connected to said second apparatus, and means responsive to the recorder drum coming into phase with the transmitter drum for switching said motor from said second apparatus to said first apparatus.

2. In a facsimile system, a receiving station including a recorder drum, a motor for driving said drum, means for driving said motor by alternating currents of different frequencies, said means including a frequency switching relay, a circuit over which phasing impulses are received from a transmitting station, a circuit controlled by said recorder drum, and means whereby said circuits jointly control the operation of said relay.

3. In a facsimile system, a receiving station including a recorder drum, a motor for driving said drum, a power amplifier for supplying current to said motor, a source of alternating current at said station for operating said amplifier, a second source of alternating current, said second source having a frequency which differs from the frequency of said first source, a switching relay for substituting said second source for said first source to operate said amplifier, and means for energizing said relay responsive to a phasing impulse received from a distant transmitting station.

4. In a facsimile system, a receiving station including a recorder drum, a motor for driving said drum, two sources of alternating current for driving said motor, said sources differing in frequency, a switching relay having contacts for connecting one source and disconnecting the other, a circuit for said relay including a space discharge device, a circuit over which the transmitter at a distant station sends phasing impulses to the grid of said device, and a circuit controlled by said recorder drum for rendering said impulses ineffective to control said device while said recorder drum is out of phase with the drum at said transmitter.

PARKER B. WICKHAM.

REFERENCES CITED

The following references are of record in the file of this patent:

UNITED STATES PATENTS

| Number | Name | Date |
|---|---|---|
| 1,436,676 | Petersen | Nov. 28, 1922 |
| 1,626,731 | Herman | May 3, 1927 |
| 1,670,375 | Nyquist | May 22, 1928 |
| 2,038,375 | Mathes | Apr. 21, 1936 |
| 2,045,294 | Cooley | June 23, 1936 |
| 2,075,898 | Horton | Apr. 6, 1937 |
| 2,120,371 | Norrman | June 14, 1938 |
| 2,164,038 | McFarlane | June 27, 1939 |
| 2,275,249 | Cooley | Mar. 3, 1942 |
| 2,280,688 | Cooley | Apr. 21, 1942 |
| 2,326,740 | Artzt | Aug. 17, 1943 |